United States Patent
Hujita et al.

[15] 3,636,372

[45] Jan. 18, 1972

[54] SEMICONDUCTOR SWITCHING CIRCUITS AND INTEGRATED DEVICES THEREOF

[72] Inventors: Minoru Hujita; Minoru Nagata, both of Kodaira-shi; Seiji Kubo, Kokubunji-shi, all of Japan

[73] Assignee: Hitachi, Ltd., Tokyo, Japan

[22] Filed: Dec. 3, 1968

[21] Appl. No.: 780,690

[30] Foreign Application Priority Data

Dec. 6, 1967 Japan....................................42/77974

[52] U.S. Cl...............................307/251, 307/246, 307/288, 307/303, 307/313

[51] Int. Cl. ........................................................H03k 17/60

[58] Field of Search..................307/205, 246, 251, 255, 279, 307/288, 303, 304, 313, 316

[56] References Cited

UNITED STATES PATENTS

| | | | |
|---|---|---|---|
| 3,541,353 | 11/1970 | Seelbach et al. | 307/251 X |
| 3,130,377 | 4/1964 | Brown et al. | 307/303 X |
| 3,168,651 | 2/1965 | Szarvas | 307/313 X |
| 3,210,677 | 10/1965 | Hung Chang Lin et al. | 307/251 X |
| 3,278,853 | 10/1966 | Hung Chang Lin | 307/251 X |
| 3,488,520 | 1/1970 | Hunter | 307/304 X |

FOREIGN PATENTS OR APPLICATIONS

| | | | |
|---|---|---|---|
| 1,356,820 | 2/1964 | France | 307/313 |

*Primary Examiner*—Stanley T. Krawczewicz
*Attorney*—Craig, Antonelli & Hill

[57] ABSTRACT

A switching circuit with small consuming power and high-switching speed, in which a bipolar transistor and a resistor are connected in the emitter follower configuration to the output terminal of insulated gate-type field effect transistors in complementary connection.

4 Claims, 10 Drawing Figures

INVENTORS
MINORU HUJITA
MINORU NAGATA
SEIJI KUBO
BY Craig & Antonelli
ATTORNEYS

INVENTORS
MINORU HUJITA
MINORU NAGATA
SEIJI KUBO

BY Craig & Antonelli
ATTORNEYS

INVENTORS
MINORU HUJITA
MINORU NAGATA
SEIJI KUBO
BY
Craig & Antonelli
ATTORNEYS

INVENTORS
MINORU HUIJTA
MINORU NAGATA
SEIJI KUBO

BY

Craig & Antonelli
ATTORNEYS

SEMICONDUCTOR SWITCHING CIRCUITS AND INTEGRATED DEVICES THEREOF

This invention relates to an improvement of a complementary circuit composed of insulated gate-type field effect transistors, and to a semiconductor integrated circuit means where the above complementary circuit is formed in a sheet of semiconductor substrate.

One trend of the present semiconductor technique is to obtain a semiconductor element with a high switching speed. Another trend is to develop a integration technique capable of forming a circuit structure in a semiconductor substrate. The semiconductor integrated circuit requires that the individual circuit elements be small to enable high-density packing, and the the consuming power of the circuit in operation be small. A complementary circuit consisting of P channel and N channel insulated gate-type field effect transistors or metal-insulator-semiconductor transistors (hereafter abbreviated as MIS transistors) is well known. The characteristics of a semiconductor integrated circuit means containing such a complementary circuit are that a first MIS transistor having a first conductivity-type channel is formed in one region of the surface of a semiconductor substrate and that a second MIS transistor having a second conductivity-type channel electrically insulated from said first MIS transistor is formed in the other region of the surface of the semiconductor substrate. The complementary circuit has a smaller consuming power and a higher switching speed as compared with a usual inverter circuit formed by MIS transistors having a load resistance.

The advantage of reducing the consuming power in the semiconductor integrated circuit means is to prevent a temperature rise in the integrated circuit device and to allow the use in a wider temperature range. In large scale integration having high-density circuit elements formed in a semiconductor substrate, it is important to reduce the consuming power of circuit elements thereby to prevent generation of heat.

Another advantage of the above-described complementary MIS transistor circuit is that the operating voltage $V_{DD}$ can be made small. It is sufficient if the power source voltage (e.g., 11 v.) is a little larger than the sum of the threshold voltages of the first and second MIS transistors. However, the on-resistance of MIS transistor is usually very high, i.e., 2 KΩ to 20 KΩ. So, when the load of an output stage MIS transistor is capacitive, the switching speed can not be made satisfactorily high notwithstanding the use of a complementary circuit. The on-resistance $R_{ON}$ of MIS transistor is given by $$R_{\rm ON}=\frac{Kl}{(V_{\rm GS}-V_{\rm T})W} \qquad (1)$$

where $l$ is the channel length, $W$ is the channel width, $V_{GS}$ is an applied voltage between the source and the gate, $V_T$ is the threshold voltage and $K$ is the structure constant. In order to decrease the value of $R_{ON}$ either the channel length $l$ or the channel width W should be changed. Since it is difficult because of industrial considerations to decrease the channel length $l$ to less than a certain value (e.g., 10 μ), the channel width $W$ should be increased. For this purpose it is necessary that the output stage MIS transistor has a channel width about 10 times as large as that of the stage coupling MIS transistor. For example, when the channel width and length of a stage coupling MIS transistor are 20 μ and 10 μ, those of an output stage MIS transistor should be 300 μ and 10 μ respectively. In this case, the on-resistance of the stage coupling MIS transistor is several tens KΩ while that of the output stage MIS transistor is a few KΩ. However, if the channel width W is large, the area occupied by the output stage MIS transistor on the surface of a semiconductor substrate becomes large. The large occupied area is unfavorable in the semiconductor integrated circuit means if many high-density circuit elements are to be formed in one semiconductor substrate. For example, in a delay circuit the necessary occupied area of one stage coupling MIS transistor is 50×50 μ whereas that for one complementary MIS output stage transistor is 400×400 μ, which is very disadvantageous. The complementary MIS transistor can operate at a low voltage as mentioned above. The delay time $T_d$ of a complementary MIS transistor may be expressed as $$T_{\rm d}=\frac{k_1}{\left(1-\frac{V_{\rm TN}}{V_{\rm DD}}\right)^2}+\frac{k_2}{\left(1-\frac{V_{\rm TP}}{V_{\rm DD}}\right)^2} \qquad (2)$$

where $k_1$ and $k_2$ are proportional coefficients, $V_{TN}$ and $V_{TP}$ are the threshold voltages of $N$ channel and $P$ channel MIS transistors, and $V_{DD}$ is the operating voltage. It is seen in equation (2) that with a low $V_{DD}$ the delay time $T_d$ is large. When the complementary circuit is used at a low voltage, the switching speed becomes extremely low.

Therefore, one object of this invention is to provide a complementary MIS transistor circuit having a high switching speed.

Another object of this invention is to obtain a semiconductor integrated circuit means having a high switching speed.

Still another object of this invention is to obtain a semiconductor integrated circuit means having a switching speed even if it is driven by a low voltage.

In view of the fact that the on-resistance of a bipolar transistor is considerably lower than that of an MIS transistor, the invention is characterized in that the switching speed is improved by connecting a bipolar transistor in the emitter follower configuration to the output of complementary MIS transistors. When such a circuit composition is formed in a sheet of semiconductor substrate, the integrated circuit thereby obtained has a very small occupied area. Namely, this invention can provide a circuit composition suitable for a semiconductor integrated circuit means.

The invention will be understood more clearly from the following detailed description taken in conjunction with the accompanying drawings, in which.

Figure 2:
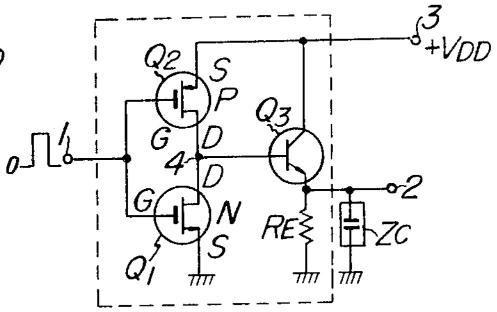
FIG. 2 is a switching circuit according to one embodiment of this invention.
Figure 6A:
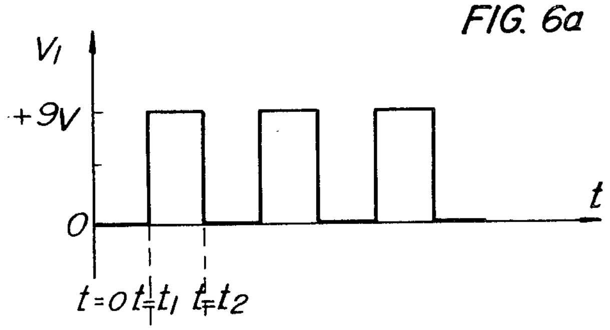
Figure 6B:
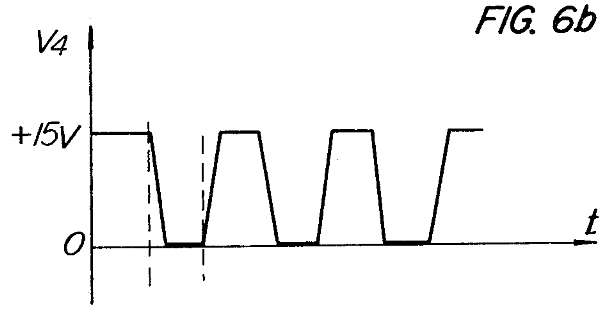
Figure 6C:
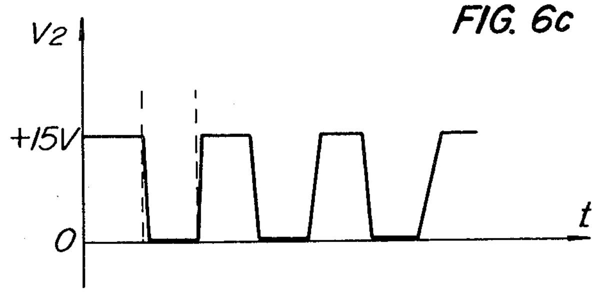

FIGS. 6*a* to 6*c* show waveforms to explain the operation of the circuit of this invention as shown in FIG. 2.

Figure 7:
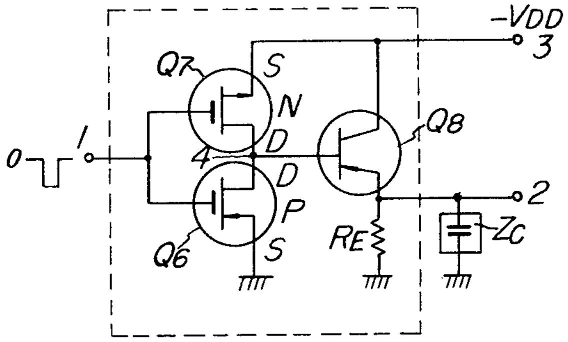

FIG. 7 is a switching circuit according to a further embodiment of this invention.

Figure 8:
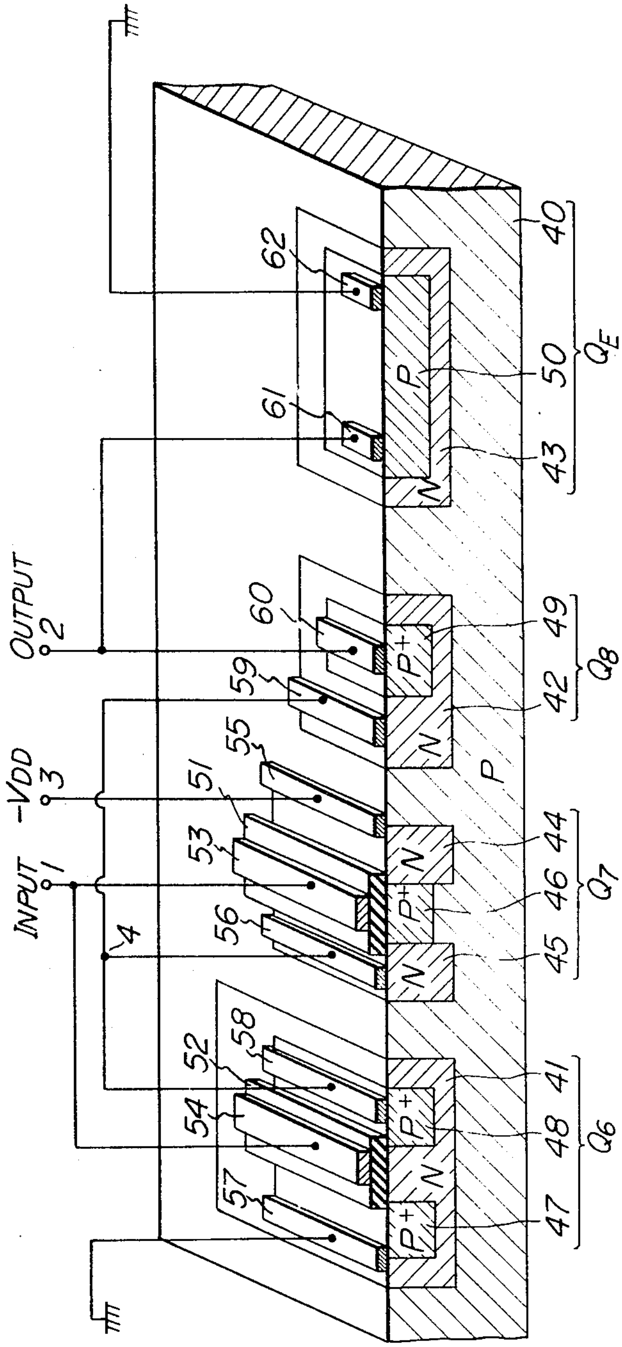

FIG. 8 is a perspective sectional view of a semiconductor integrated circuit means according to still another embodiment of this invention.

Figure 1:
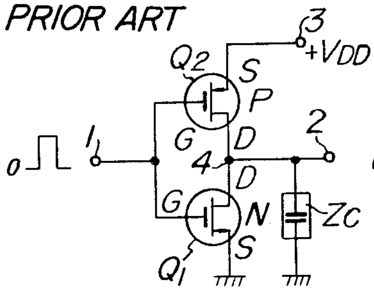
FIG. 1 PRIOR ART
FIG. 1 is a prior art MIS transistor circuit.

First, a brief explanation will be given of the switching operation of prior art MIS transistors of complementary connection as shown in FIG. 1. For illustration, an N channel enhancement mode MIS transistor $Q_1$ and a P channel enhancement mode MIS transistor $Q_2$ are connected in complementary manner as shown in FIG. 1. With the application of a pulse signal at the input terminal 1 either one of the transistors $Q_1$ and $Q_2$ becomes on and the other one becomes off respectively, thereby performing the switching action. If a capacitive load $Z_c$ is connected to the output terminal 2, the response time of the switching action is determined by the product of the on-resistances $R_{ON}$ of the transistors $Q_1$ and $Q_2$ and the capacitive component C of the load $Z_c$. For example, when $R_{ON}$ is 20 KΩ and C is 50 pf., the response time of the circuit is about 1 μ sec.

Next, detailed explanation of the embodiments of this invention will be made with reference to the drawings.

In FIG. 2, a circuit for explaining the fundamental concept of this invention is shown. The base electrode of a bipolar transistor $Q_3$ is connected to the output terminal 4 of the complementary MIS transistors $Q_1$ and $Q_2$. The emitter electrode is grounded through a resistor $R_E$. The collector electrode together with the source electrode of the MIS transistor $Q_2$ is connected to a power source. A capacitive load $Z_c$ is connected to the output terminal of the bipolar transistor $Q_3$. The operation of the circuit of this invention will be explained with reference to FIG. 2 and FIGS. 6*a*, 6*b* and 6*c*. Here, only for illustration, $Q_1$ is an N-type enhancement mode MIS transistor, $Q_2$ is a P-type enhancement mode MIS transistor, $Q_3$ is an NPN-type bipolar transistor and a positive voltage is applied to the terminal 3. However, it will be understood from the following explanation that this invention is not restricted by the above example. FIGS. 6*a*, 6*b* and 6*c* show the waveform of an input signal voltage $V_1$ applied at the input terminal 1, the waveform of the voltage $V_4$ at the terminal 4, and the waveform of the output voltage $V_2$ appearing at the output terminal 2 respectively, the abscissa representing time. When the input terminal 1 is at zero potential, i.e., from $t$=0 to $t$=$t_1$, the transistor $Q_1$ is off. Since a negative voltage is given to the gate electrode of the MIS transistor $Q_2$ with respect to the source electrode, the transistor $Q_2$ is on. As a result, an output voltage $V_4$, e.g., 15 v. appears at the output terminal of the complementary circuit. In this case the PN junction between the base and the emitter of the bipolar transistor $Q_3$ is given a forward bias. Hence, the transistor $Q_3$ is on. The collector current flows through the on-resistance $R_{ON}$, the emitter resistor $R_E$ and the capacitive load $Z_c$, whereby charges are stored in the capacitive component C of the load $Z_c$. The time constant of discharge is given by C·$R_{ON}$. The on-resistance $R_{ON}$ of the bipolar transistor $Q_3$ is smaller than that of the aforementioned prior art MIS transistors $Q_1$ and $Q_2$ so that the charging time becomes shorter and the response speed is improved. Next when a pulse signal voltage $V_1$ is applied at the input terminal 1, i.e., from $t$=$t_1$ to $t$=$t_2$, the voltage between the gate and the source of the MIS transistor $Q_2$ becomes smaller than the threshold voltage and the MIS transistor $Q_2$ becomes off, while a positive potential is given to the gate electrode of the MIS transistor $Q_1$ with respect to the source electrode and the MIS transistor $Q_1$ becomes on. At the same time the output voltage $V_4$ of the complementary circuit is given a zero potential and the bipolar transistor $Q_3$ is set to be off. The charges stored in the capacity component C of load $Z_c$ are discharged in accordance with the time constant C·$R_E$. The time constant of discharge is reduced by using a resistor of a small resistance as the emitter resistor $R_E$. Hence, the response speed is improved. The input resistance of the emitter follower circuit is high. The capacitive component C of the load $Z_c$ acts as a load capacitance $C/\beta$ connected to the output terminal 4, determining the switching characteristic at the output of the complementary circuit, where $\beta$ is the amplification factor of the transistor $Q_3$ when the same is in the emitter-grounded configuration. Since $C/\beta$ is small, the switching speed is not deteriorated even if the on-resistance of the MIS transistors $Q_1$ and $Q_2$ is high.

Figure 3:
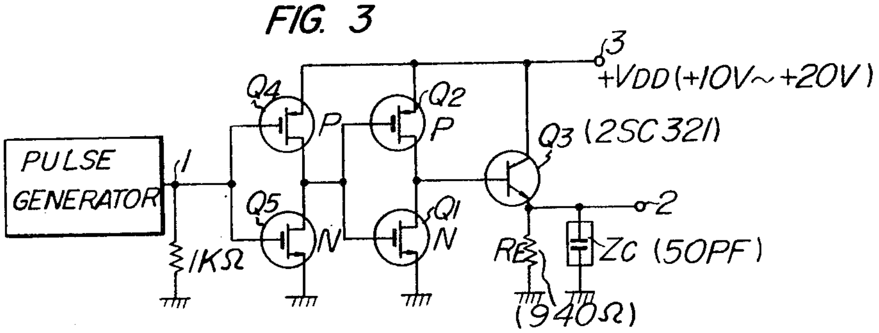
FIG. 3 is a switching circuit according to another embodiment of this invention.
Figure 4:
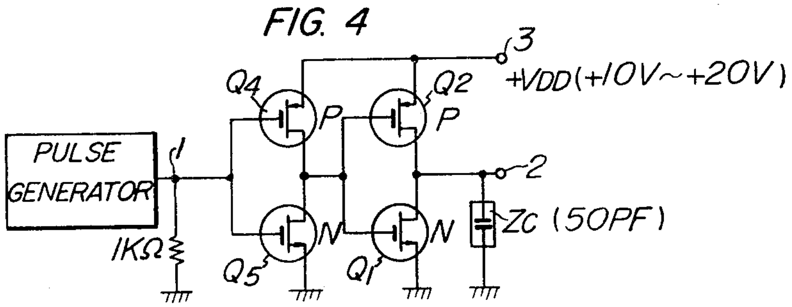
FIG. 4 is a complementary MIS transistor circuit as compared to the circuit of this invention shown in FIG. 3.

As described below, this invention can realize a circuit having high-speed characteristics by connecting an emitter follower bipolar transistor to the output terminal of the complementary type MIS transistor circuit. In order to further elucidate the characteristic of the inventive circuit the switching characteristics of the circuits shown in FIGS. 3 and 4 are measured in comparison. FIG. 3 shows an application of the circuit of this invention in which the bipolar transistor $Q_3$ is an NPN silicon transistor 2SC321, the emitter load resistor $R_E$ is 940 Ω and the capacitive load is a 50 pf. condenser. FIG. 4 shows a circuit for comparison, where a load $Z_c$ is connected to a complementary circuit but no bipolar transistor is connected. The P channel enhancement mode MIS transistors $Q_2$ and $Q_4$ are designed to have a channel length 15 μ and a channel width 500 μ while the N channel enhancement mode MIS transistors $Q_1$ and $Q_5$ are designed to have a channel length 20 μ and a channel width 500 μ. A pulse signal voltage with a peak value of 7 v. is applied by a pulse generator to the input terminal 1. The waveform of the pulse voltage appearing at the output terminal 2 is observed for different values of power source voltage $V_{DD}$, i.e., 10 v., 15 v. and 20 v. The rise time, the fall time and the delay time of the pulse waveform were measured. The results of the measurement are as follows.

TABLE 1

| | Power source voltage $V_{DD}$ | 10 V, μ sec. | 15 V, μ sec. | 20 V, μ sec. |
|---|---|---|---|---|
| Circuit in Figure 3 | Rise time | 0.1 | 0.05 | 0.05 |
| | Fall time | 0). | 0.1 | 0.1 |
| | Delay time | 0.1 | 0.075 | 0.075 |
| Circuit in Figure 4 | Rise time | 0.4 | 0.2 | 0.1 |
| | Fall time | 0.3 | 0.18 | 0.08 |
| | Delay time | 0.35 | 0.19 | 0.09 |

As can be understood from the above table, the circuit of this invention in FIG. 3 possesses the characteristics of higher switching speed than the circuit in FIG. 4. For example, with the power source voltage $V_{DD}$=10 v. the delay time is improved by about 0.25 μs.

Figure 5:
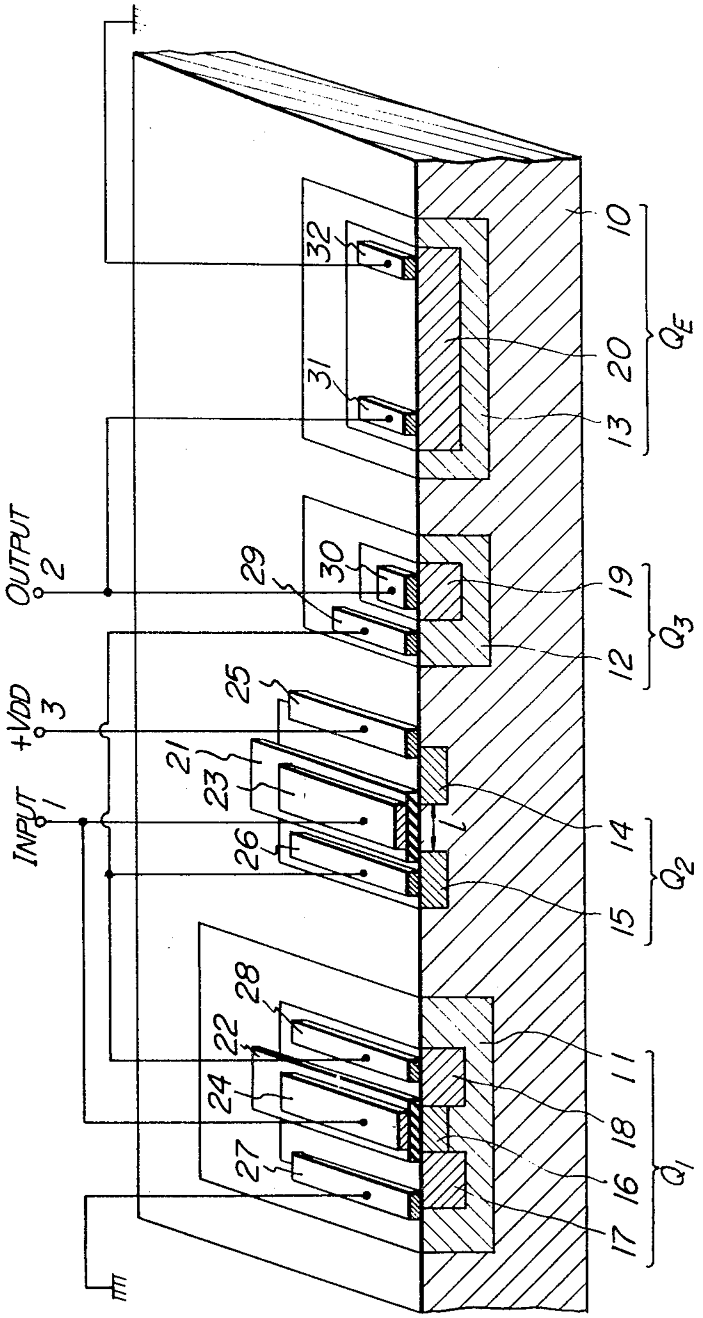
FIG. 5 is a perspective sectional view of a semiconductor integrated circuit means according to still another embodiment of this invention.

Next, a so-called integrated circuit means where the circuit of this invention is formed in a sheet of semiconductor substrate will be explained with reference to FIG. 5, in which 10 is an N-type silicon monocrystalline substrate with a resistivity of 1 to 5 Ω-cm. 11, 12 and 13 are P-type boron diffused layers with a sheet resistance of 300 to 600 Ω/□and a depth of about 5 μ. 14, 15 and 16 are P-type regions with a depth of about 2 μ highly doped with boron. The gap *l* between the regions 14 and 15 is defined 15 μ. 17, 18, 19 and 20 are N-type diffused regions of phosphorus with a sheet resistance of 10 to 50 Ω/μ□ and a depth of 3μ. The gap between the regions 17 and 18 is defined to 20μ. 21 and 22 are insulating films such as silicon oxide films ($SiO_2$) with a thickness of 1,500 A., provided between the regions 14 and 15 and between the regions 17 and 18. A major part of the surface of silicon substrate 10 is actually covered with the insulating film, i.e., $SiO_2$ film. However, for a better understanding the $SiO_2$ film on the remaining surface portion is omitted in FIG. 5. 23 and 24 are aluminum evaporation films provided on the surface of the $SiO_2$ film. 25, 26, 27, 28, 29, 30, 31 and 32 are aluminum electrodes electrically connected to each diffused region. The electrode 25 is mounted on a PN junction between the substrate 10 and the diffused region 14, while the electrode 27 is mounted on a PN junction between the regions 11 and 17. Thus, the regions 14 and 15 constitute the source and drain regions of the P channel enhancement mode MIS transistor $Q_2$, and the regions 17 and 18 constitute the source and drain regions of the N channel enhancement mode MIS transistor $Q_1$. The regions 12 and 19 together with the substrate 10 form an NPN bipolar transistor and the region 20 forms the emitter resistor $R_E$. The regions 11 and 13 are P-type isolation regions. The circuit elements are mutually connected in accordance with the connection diagram as shown roughly in FIG. 5. This wiring is done by evaporating aluminum on the $SiO_2$ film. Thus, the circuit composition surrounded by dotted lines as shown in FIG. 2 can be constituted in one semiconductor substrate. The MIS transistor $Q_1$ occupies an area of 100 μ×100 μ, MIS of transistor $Q_2$ 50 μ×60 μ, bipolar transistor $Q_3$ 50 μ×50 μ, the emitter resistor $R_E$ 100 μ×100 μ. Therefore, all the circuit elements can be formed in to occupy only an area 300 μ×150 μ in the surface of the substrate.

When the prior art complementary circuit shown in FIG. 1 is integrated in a semiconductor substrate and the on-resistance of a transistor is decreased to obtain the same switching speed as that of the inventive circuit, the MIS transistor $Q_1$ occupies an area of 500 μ×200 μ and the MIS transistor $Q_2$ 500 μ×150 μ. Therefore, the surface region for all the circuit elements requires an area of about 350 μ×500 μ. Considering that the integration of the circuit of this invention shown is in FIG. 2 requires only a small area, it is clear that the circuit of this invention is very suitable for integration.

Next another embodiment of this invention will be explained with reference to FIG. 7. The base electrode of a PNP-type bipolar transistor $Q_8$ is connected to the output terminal 4 of P-type and N-type enhancement mode MIS transistors $Q_6$ and $Q_7$. The emitter electrode is grounded through a resistor $R_E$, and the collector electrode together with the source electrode of the MIS transistor $Q_7$ is connected to a power source $V_{DD}$. A capacitive load $Z_c$ is connected to the output terminal 2 of the bipolar transistor $Q_8$. Since the operation of the circuit in FIG. 7 is the same as that of the circuit shown in FIG. 2, the explanation will not be repeated.

FIG. 8 shows another embodiment where the circuit shown in FIG. 7 is integrated. 40 is a P-type silicon monocrystalline substrate. 41, 42, 43, 44 and 45 are N-type phosphorus diffused regions having a sheet resistance of 10 to 50 Ω/□and a depth of 5 $\mu$. 46, 47, 48 and 49 are $P^+$-type regions with a depth of about 3 $\mu$ highly doped with boron. The gap between the regions 44 and 45 is set at 12 $\mu$, while the gap between the regions 47 and 48 is set at about 15 $\mu$. 50 is a P-type boron diffused region having a sheet resistance of 300 to 600 Ω/□and a depth of about 3 $\mu$. 51 and 52 are insulating films such as silicon oxide films ($SiO_2$) with a thickness of 1,500 A., provided between the regions 44 and 45 and between the regions 47 and 48. The major part of the surface of silicon substrate 40 is actually covered with the insulating film. However, for the sake of brevity the film is omitted in the figure. 53 and 54 are aluminum evaporation films provided on the surface of the $SiO_2$ film. 55, 56, 57, 58, 59, 60, 61 and 62 are aluminum electrodes electrically connected to each diffused region. The electrode 50 is mounted on a PN junction between the substrate 40 and the diffused region 44. While the electrode 57 is mounted on a PN junction between the regions 41 and 47. Thus, the regions 44 and 45 constitute the source and drain electrodes of the N type enhancement mode MIS transistor $Q_7$ and the regions 47 and 48 constitute the source and drain electrodes of the P-type enhancement mode MIS transistor $Q_6$. The regions 42 and 49 together with the substrate 40 form a PNP bipolar transistor, and the region 50 forms an emitter resistor $R_E$. The regions 41 and 43 are N-type isolation regions. The elements are interconnected in accordance with the connection diagram as shown roughly in FIG. 8. This wiring is done by evaporating aluminum on the $SiO_2$ film. Thus, the circuit composition surrounded by dotted lines as shown in FIG. 2 can be constituted in one semiconductor substrate. In this semiconductor integrated circuit means, the area occupied by all the circuit elements on the surface of a substrate is extremely small as in the integrated circuit in FIG. 5. Therefore, a high-density integrated circuit can be obtained.

What is claimed is:

1. A switching circuit comprising a first pair of insulated gate type field effect transistors connected in complementary manner having a first common input terminal and a first output terminal thereof, a second pair of insulated gate type field effect transistors connected in complementary manner having a second common input terminal and a second output terminal thereof, said second input terminal being connected to said first output terminal so as to series-connect said first pair of transistors with said second pair of transistors, and a bipolar transistor connected in emitter follower configuration to said second output terminal.

2. A switching circuit comprising:

- a first insulated gate type field effect transistor having a channel of a first conductivity-type and gate, source and drain electrodes;
- a second insulated gate type field effect transistor having a channel of a second conductivity-type and gate, source and drain electrodes;
- a bipolar transistor having emitter, base and collector electrodes;
- an input means for supplying a signal voltage simultaneously to the gate electrodes of said first and second transistors;
- a means for electrically connecting the drain electrodes of said first and second transistors;
- a means for supplying an electric potential to said source electrode of said second transistor with respect to said source electrode of said first transistor;
- a means for electrically connecting said drain electrode of said first transistor with said base electrode of said bipolar transistor;
- a means for electrically connecting said source electrode of said second transistor to said collector electrode of said bipolar transistor;
- a resistance means connected between said source electrode of said first transistor and said emitter electrode of said bipolar transistor; and a capacitance load connected in parallel to said resistance means.

3. The switching circuit according to claim 2, wherein said first transistor is an N-type enhancement mode field effect transistor, said second transistor is a P-type enhancement mode field effect transistor, and said bipolar transistor is an NPN-type transistor.

4. The switching circuit according to claim 2, wherein said first transistor is a P-type enhancement mode field effect transistor, said second transistor is an N-type enhancement mode field effect transistor, and said bipolar transistor is a PNP-type transistor.

* * * * *